US 6,557,678 B1

(12) United States Patent
Simonds

(10) Patent No.: US 6,557,678 B1
(45) Date of Patent: May 6, 2003

(54) TRANSMISSION

(75) Inventor: Edward L. Simonds, Adel, IA (US)

(73) Assignee: Thermal Dynamics, Inc., Adel, IA (US)

( * ) Notice: Subject to any disclaimer, the term of this patent is extended or adjusted under 35 U.S.C. 154(b) by 0 days.

(21) Appl. No.: 09/713,959

(22) Filed: Nov. 16, 2000

(51) Int. Cl.⁷ .............................................. F16D 21/02
(52) U.S. Cl. ...................... 192/12 B; 192/48.9; 192/51; 74/143; 74/88
(58) Field of Search ................................ 192/34, 12 B, 192/45.1, 41 A, 48.92, 48.9, 48.3, 65, 51; 74/142, 143, 148, 88

(56) References Cited

U.S. PATENT DOCUMENTS

| 4,712,789 A | * | 12/1987 | Brilando ...................... 272/73 |
| 4,757,988 A | * | 7/1988 | Szymski ...................... 272/73 |
| 4,902,001 A | * | 2/1990 | Balbo .......................... 272/73 |
| 5,461,863 A | * | 10/1995 | Simonds ...................... 60/676 |
| 5,617,936 A | * | 4/1997 | Nemoto ...................... 192/4 A |
| 5,967,016 A | | 10/1999 | Simonds |
| 5,974,943 A | | 11/1999 | Simonds |
| 6,203,041 B1 | * | 3/2001 | Helm ........................ 280/250.1 |

* cited by examiner

Primary Examiner—Saul Rodriguez
(74) Attorney, Agent, or Firm—Brett Trout

(57) ABSTRACT

A transmission assembly comprising an overrunning clutch assembly comprising a race having an inner annular contact surface, a plurality of sprags provided along the inner annular contact surface of the race, and defining a drive space, means for retaining the plurality of sprags along the inner annular contact surface of the race, a shaft having a drive portion with a drive diameter sufficient to cause rotation of the shaft in response to a rotation of the race when the drive portion is positioned at least partially within the drive space and means for moving the drive portion of the shaft at least partially into and out of the drive space.

18 Claims, 7 Drawing Sheets

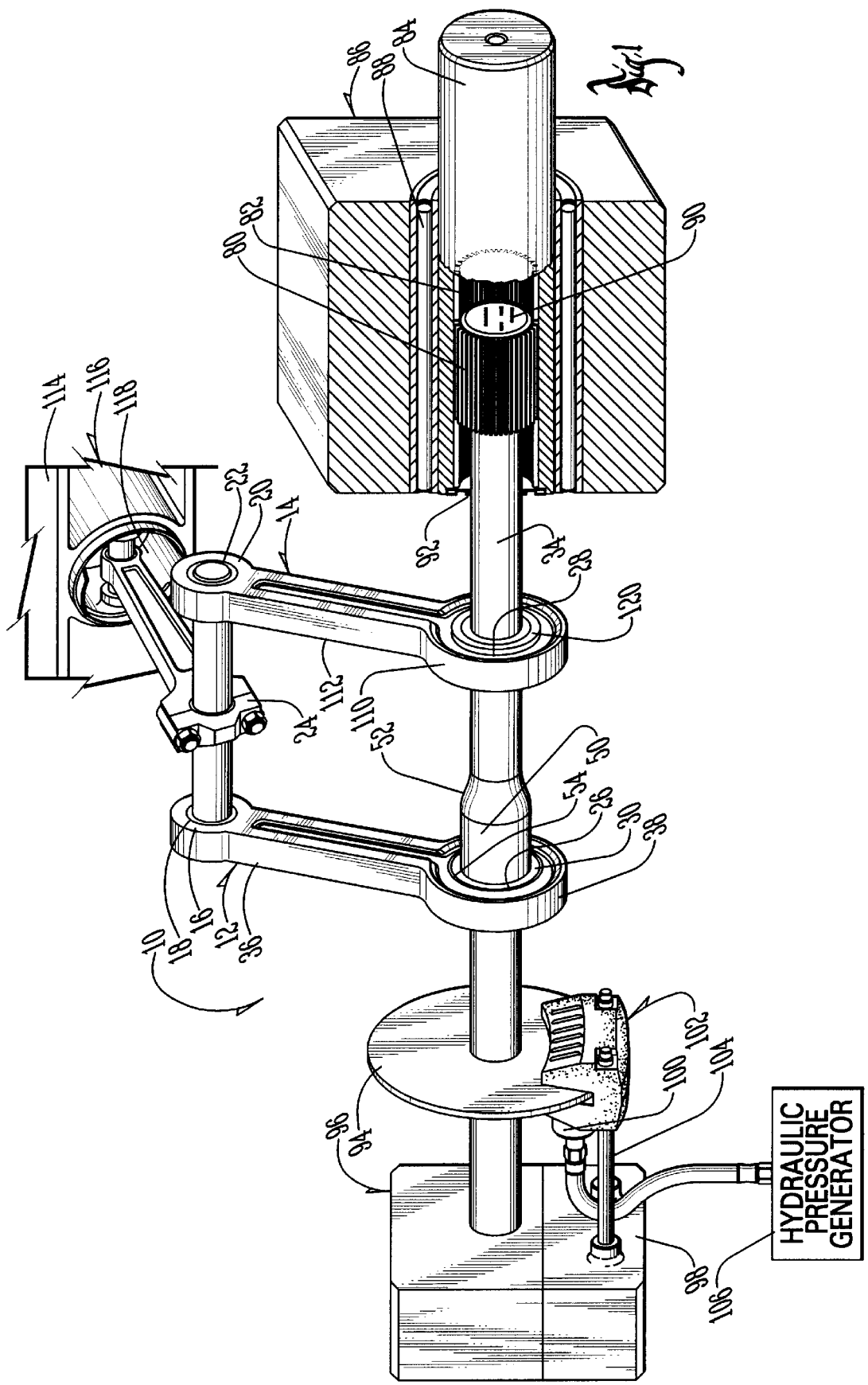

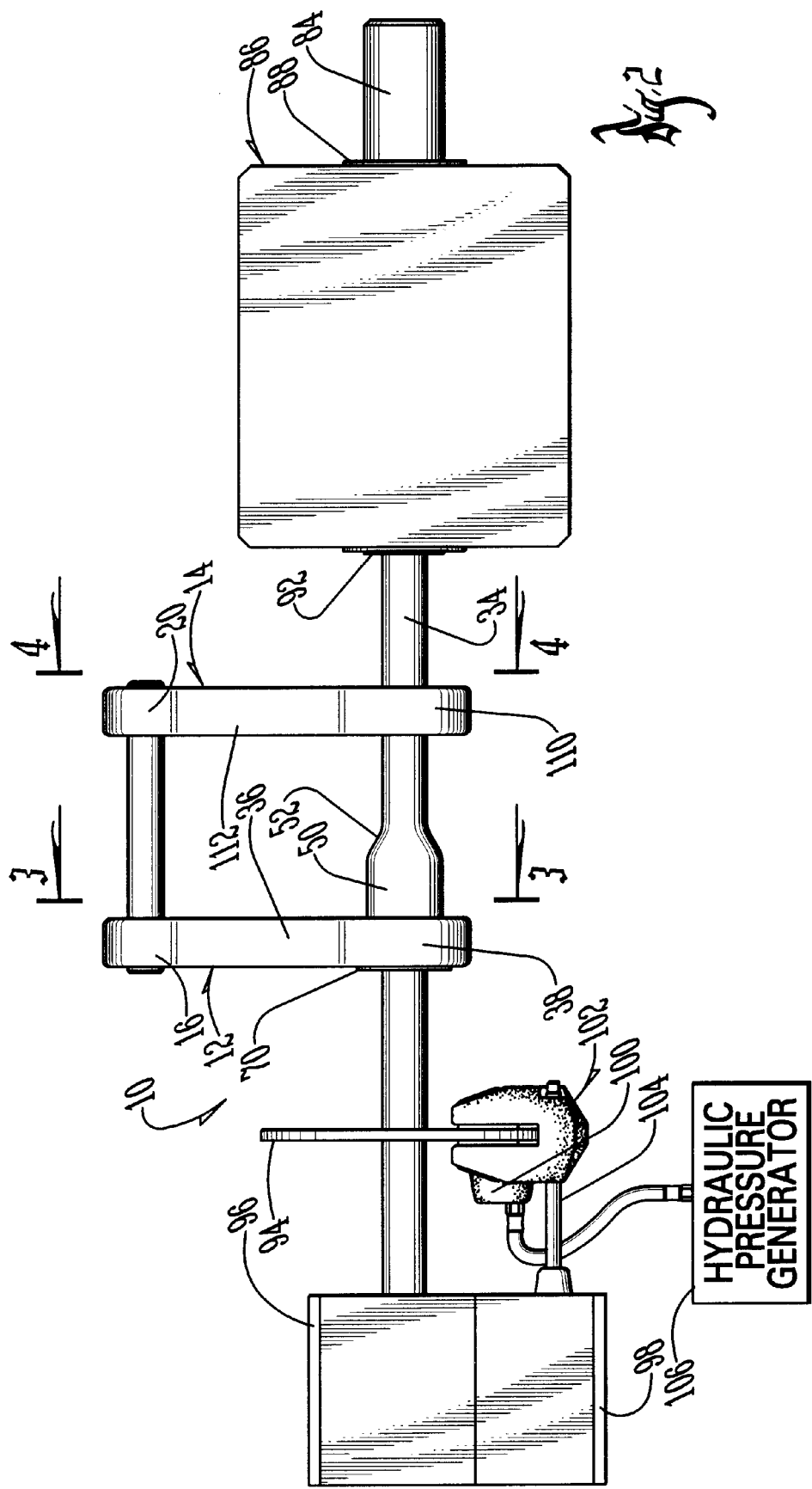

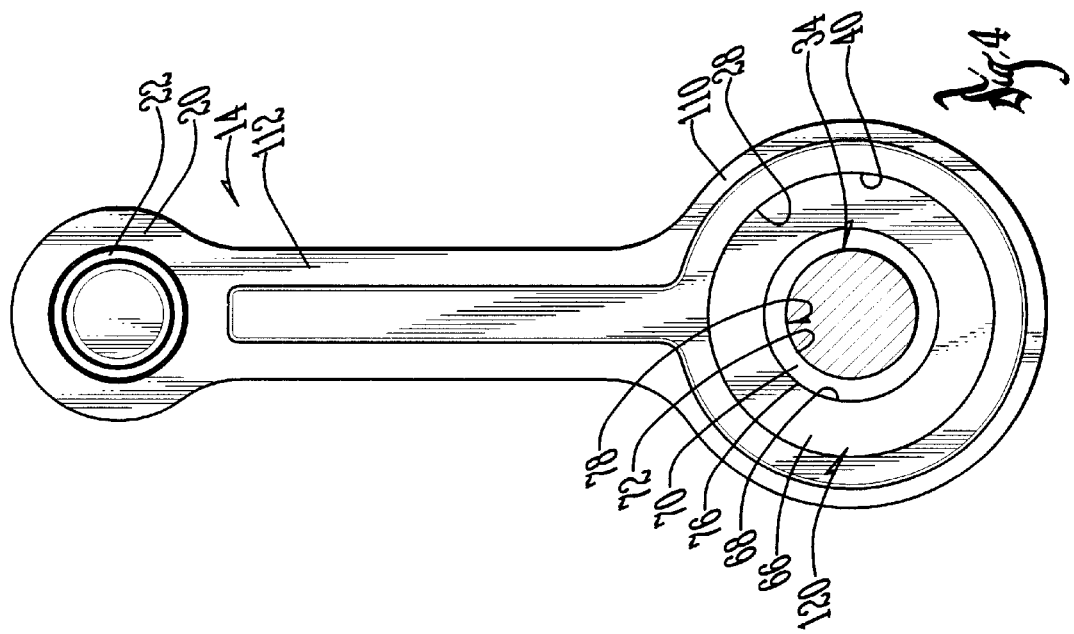
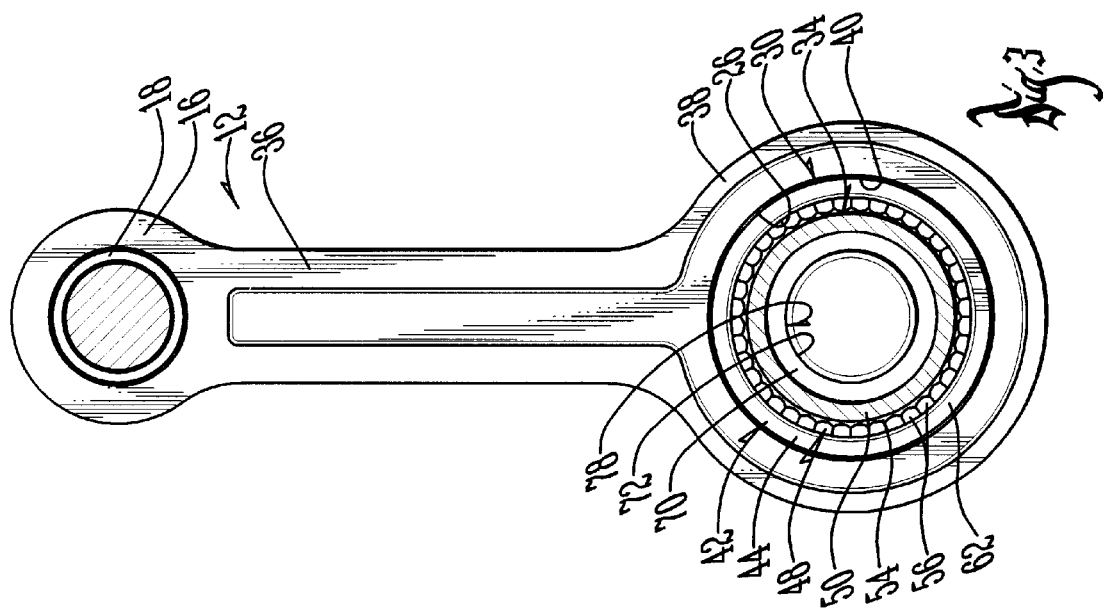

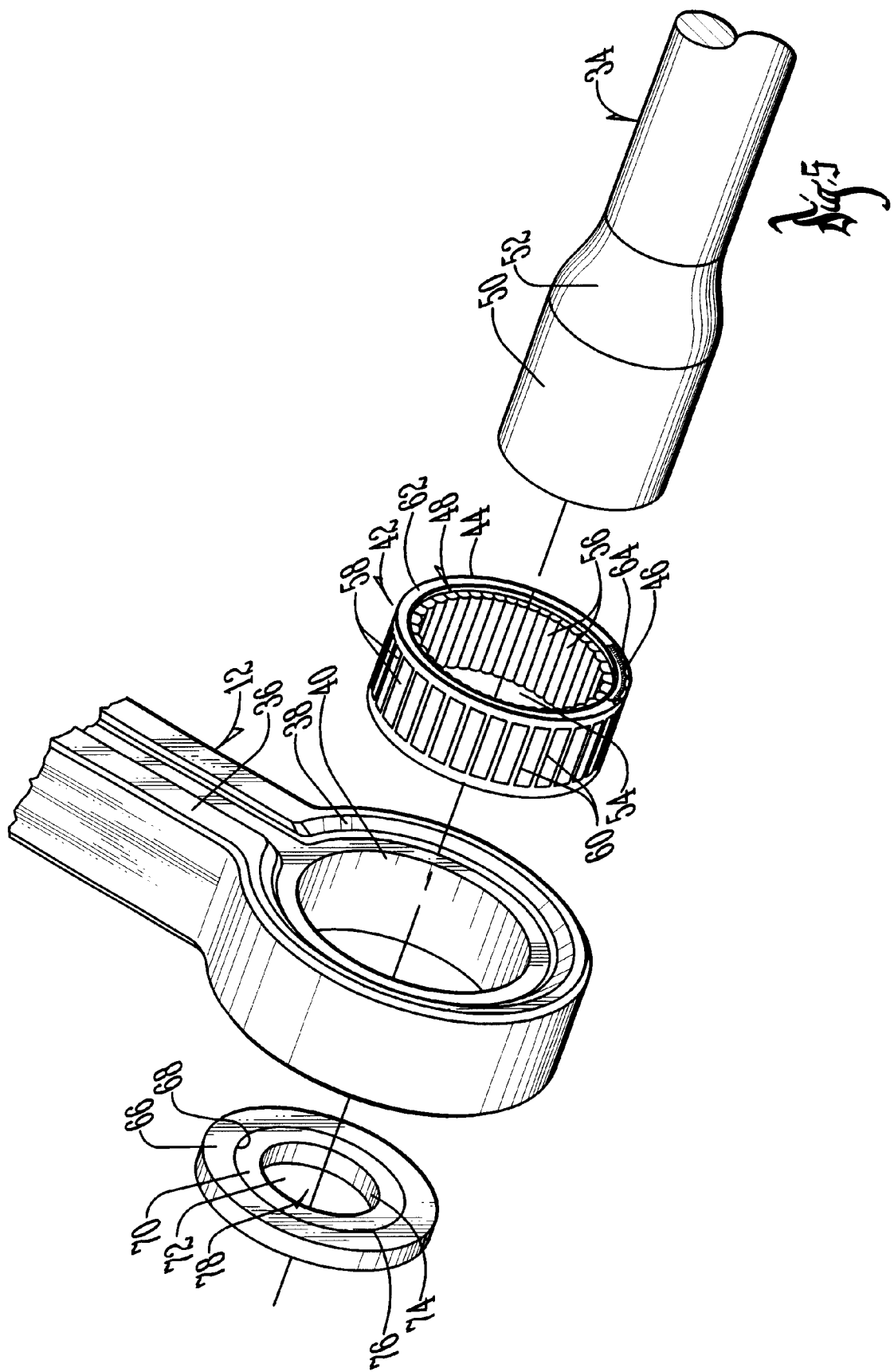

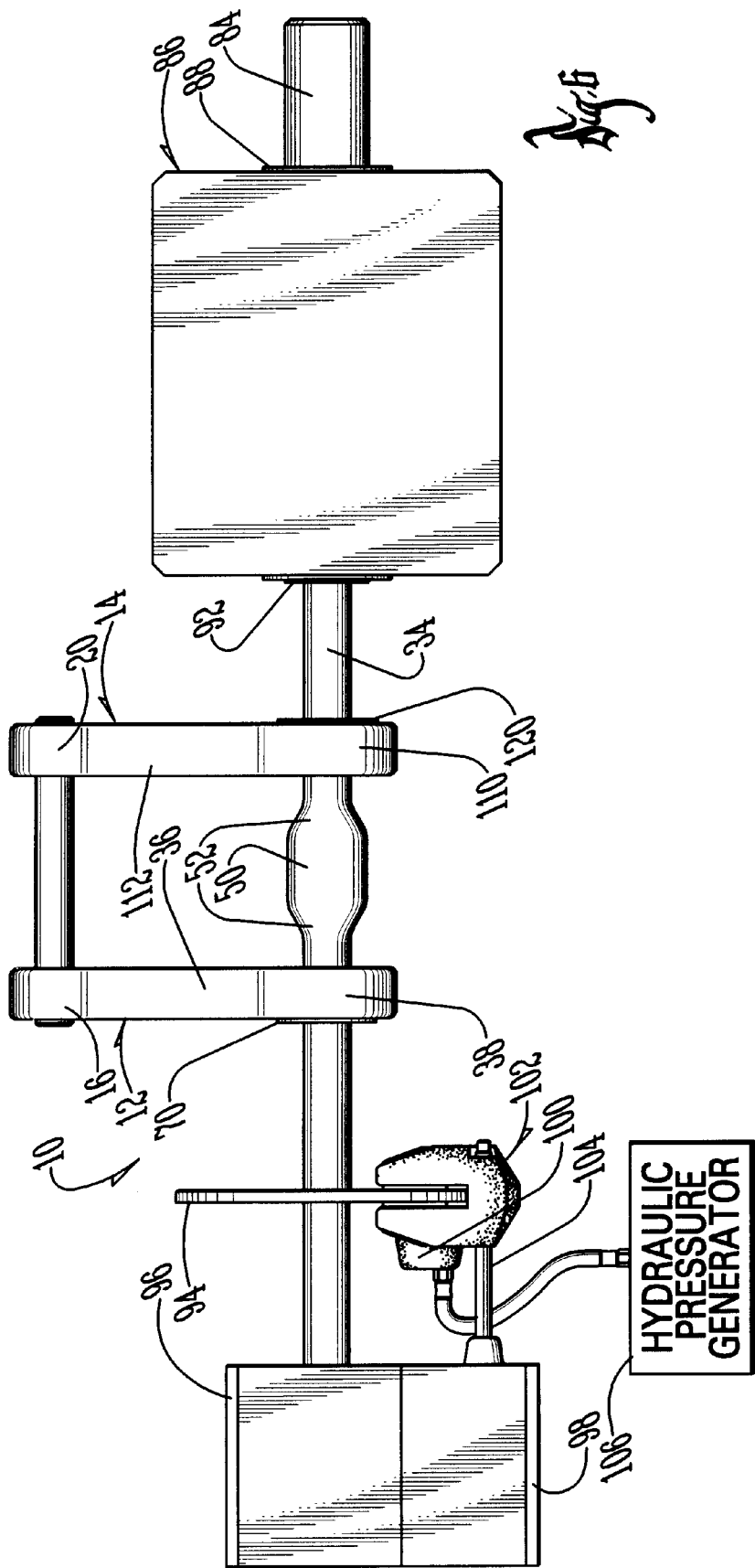

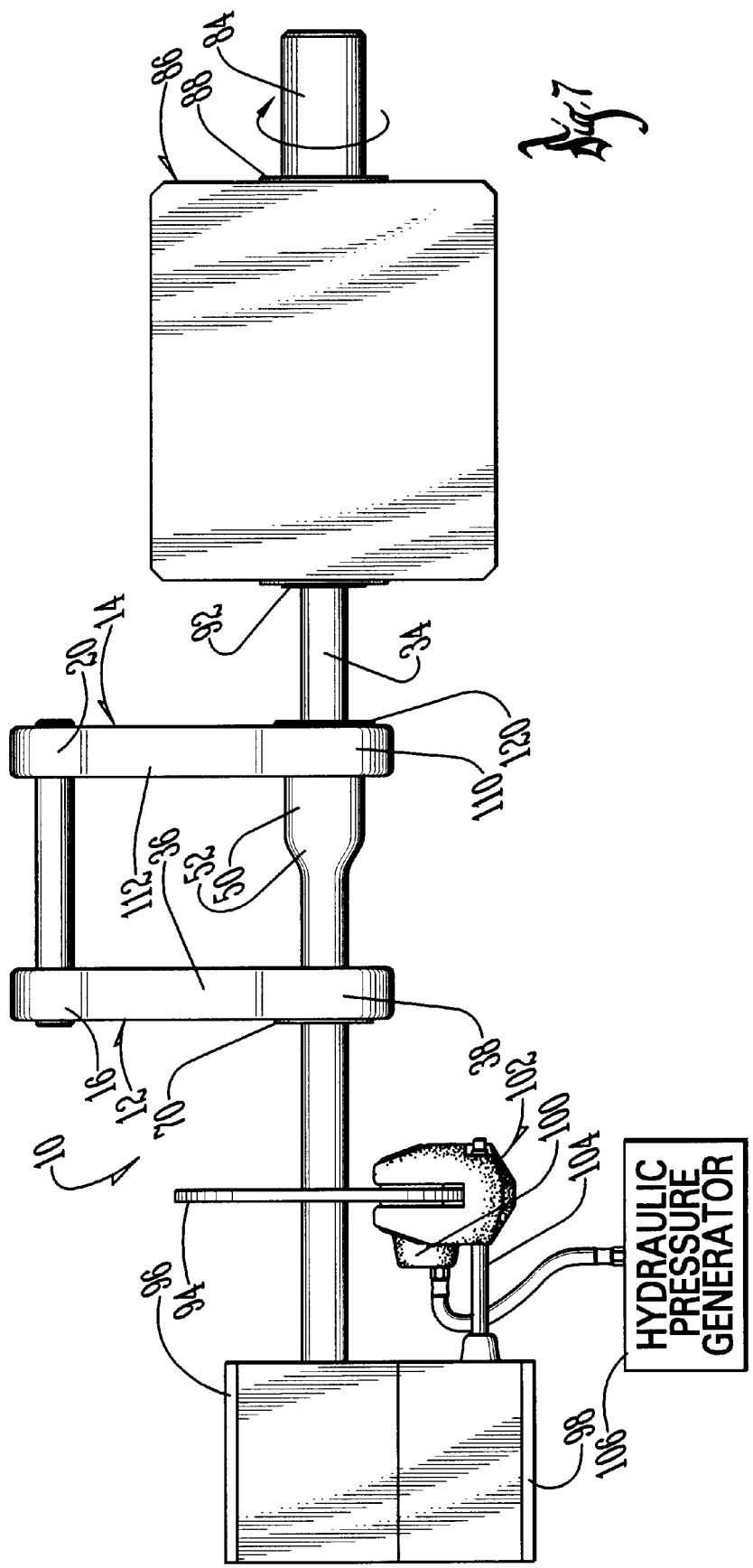

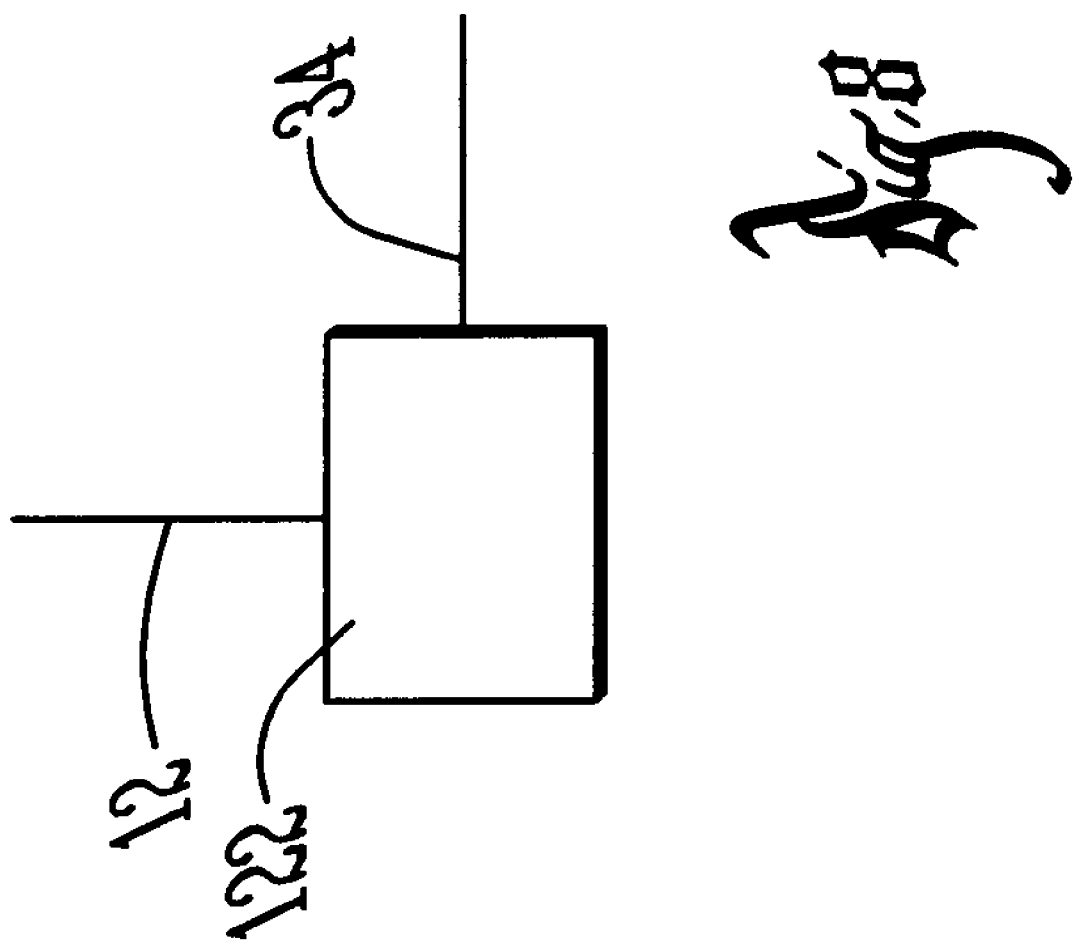

TRANSMISSION

BACKGROUND OF THE INVENTION

1. Field of the Invention

The present invention relates in general to a transmission for reversing the rotational direction of a drive shaft and, more particularly, low cost, long wearing transmission for reversing the direction of a drive shaft.

2. Description of the Prior Art

Transmissions assemblies for reversing the drive direction of a drive shaft are known in the art. The general configuration of such transmission assemblies are a drive shaft secured to a toothed gear. Such transmissions typically include a load shaft also secured to a toothed gear. A counter shaft gear set is also provided to transfer torque from the drive shaft to the load shaft. Shift forks are used to slide the load shaft to bring various toothed gears of the load shaft into contact with various toothed gears of the countershaft. A reverse gear shaft is also provided to transfer torque between the countershaft and load shaft in a direction opposite that resulting from a direct transfer of power between the countershaft and load shaft.

In prior art transmission assemblies, the transfer of power using toothed gears often leads to premature wear, a build-up of metal filings in the transmission case, a loss of efficiency associated with missing teeth, and a complex transmission including synchronizers, bearings, gaskets, rings, seals, bolts and the like. Such prior art assemblies require an extensive amount of machining and are costly to assemble. Maintenance on such prior art assemblies is time consuming and costly, and drastically increases as such prior art transmission assemblies age.

Additionally, prior art transmissions of torque using toothed gears leads to a relatively high level of friction and loss motion, thereby decreasing the efficiency of such transmissions.

Prior art transmissions, therefore, have numerous disadvantages, including high costs of production and maintenance, and lowered efficiency. It would be desirable to provide an improved transmission assembly, costing less to produce and maintain and more efficiently transferring power from a drive shaft to a load shaft. The difficulties encountered in the prior art discussed hereinabove are substantially eliminated by the present invention.

SUMMARY OF THE INVENTION

In an advantage provided by this invention, a transmission assembly alternatively translates linear actuation into torque on a load shaft in a first direction to torque on the load shaft in the opposite direction.

Advantageously, this invention provides a transmission assembly having a small number of parts.

Advantageously, this invention provides a transmission assembly with low maintenance requirements.

Advantageously, this invention provides a transmission assembly of compact size.

Advantageously, this invention provides a transmission assembly with low cost, easily machinable parts.

Advantageously, this invention provides a transmission assembly of a durable and longwearing construction.

Advantageously, in a preferred example of this invention, a transmission assembly is provided, comprising an overrunning clutch assembly, comprising a race having an inner annular contact surface, a plurality of sprags provided along the inner annular contact surface of the race, the plurality of sprags defining a drive space, means for retaining the plurality of sprags along the inner annular contact surface of the race, a shaft having a drive portion with a drive diameter sufficient to cause rotation of the shaft in response to a rotation of the race when the drive portion is positioned at least partially within the drive space, and means for moving the drive portion of the shaft at least partially into and out of the drive space.

BRIEF DESCRIPTION OF THE DRAWINGS

The present invention will now be described by way of example, with reference to the accompanying drawings in which:

FIG. 1 illustrates an example perspective cut away of a transmission assembly according to this invention in the drive orientation;

FIG. 2 illustrates a side elevation of the transmission assembly of FIG. 1;

FIG. 3 illustrates a cross-section of the transmission assembly taken along Line 3—3 of FIG. 2;

FIG. 4 illustrates a cross-section cutaway of the transmission assembly taken along Line 4—4 of FIG. 2.

FIG. 5 is an exploded perspective of the sprag portion of the swing arm of FIG. 1;

FIG. 6 illustrates a side elevation view of the transmission assembly of FIG. 1 in the neutral orientation; and FIG. 7 illustrates a side elevation view of the transmission assembly of FIG. 1 in the reverse drive orientation;

FIG. 8 illustrates a schematic representation of an alternative embodiment of the transmission assembly according to this invention, which includes a toothed inner race and toothed shaft.

DETAILED DESCRIPTION OF THE PREFERRED EMBODIMENT

Referring to FIG. 1, a transmission assembly (10) according to this invention is shown having a first swing arm (12) and a second swing arm (14). As shown in FIG. 1, the first swing arm (12) is provided with an eyelet (16) within which is provided a needle roller bearing (18) or similar bearing known in the art to reduce friction. The second swing arm (14) is also provided with an eyelet (20) and needle-roller bearing (22). A connection rod (24) constructed of heat-treated steel is positioned within the two eyelets (16) and (20).

The swing arms (12) and (14) are constructed of hardened steel and are provided with large holes (26) and (28) to accommodate torque transfer sprags (30) and (32) (FIGS. 1 and 4). The torque transfer sprags (30) and (32) are oriented in opposing directions, so that when provided in a torque transferring orientation relative to a drive shaft (34), the first swing arm (12) drives the drive shaft (34) in a first direction, and when provided in a torque transferring orientation relative to the drive shaft (20), the second swing arm (14) transfers rotation to the drive shaft (34) in the opposite direction. Each torque transfer sprags (30) and (32) couples to the drive shaft (34) in a manner which transfers rotational energy from the swing arms (12) and (14) to the drive shaft (34) in one direction and allows the drive shaft (34) to "free wheel" relative to the swing arms (12) and (14) on the recovery stroke, so that the drive shaft (34) is not rotated in the opposite direction on the recovery stroke.

As shown in FIGS. 3 and 5, the first swing arm (12) is constructed of hardened steel to increase the longevity of the first swing arm (12). The first swing arm (12) includes a neck (36) secured to a race (38) having an inner annular contact surface (40). Provided within the race (38) is a sprag assembly (42). As shown in FIG. 5, the sprag assembly (42) comprises a sprag retainer (44), a pair of coil springs (46), and a plurality of sprags (48).

The drive portion (50) is provided with tapered shoulders (52) to bias the sprags (48). When the sprags (48) are in their upright position, the drive space (54) defined by the sprags (48) is not of a sufficient diameter to allow insertion of the drive portion (50) of the drive shaft (34) into the drive space (54). Accordingly, the tapered shoulders (52) bias the sprags (48) outward, tilting the sprags (48) slightly until the drive space (54) is enlarged sufficiently to accommodate the drive portion (50) of the drive shaft (34).

The sprags (48) are each preferably provided with a body (56) to contact the drive portion (50) of the drive shaft (34), and a head (58) to contact the inner annular contact surface (40) of the race (38). Preferably, the bodies (56) of the sprags (48) are slightly wider and shorter than both the heads (58) of the sprags (48) and the openings (60) provided in the sprag retainer (44). The width of the bodies (56) prevents the sprags (48) from falling out of the sprag retainer (44). The length of the bodies (56) provides sufficient clearance for placement of the coil springs (46) between the bodies (56) and sidewalls (62) of the sprag retainer (44). Because the bodies (56) are shorter than the heads (58), the coil springs (46) are able to bias an overhanging portion (64) of the heads (58) outward, thereby biasing the sprags (48) toward their upright position.

Secured to the inner annular contact surface (40) of the race (38) is a steel support plate (66) provided with a throughbore (68). Coupled within the throughbore (68) is a bearing assembly (70) such as those well known in the art, defining an interior opening (72) only slightly larger than the diameter of the drive shaft (34). The bearing assembly (70) may be provided with bearings either on its interior (74), exterior (76), or both. The bearing assembly (70) may be of ball bearing construction, such as that well known in the art, constructed of a low friction material such as Teflon®, or may be of any other bearing assembly type known in the art. The steel support place (66) is welded to the race (38) and the drive shaft (34) is provided through the interior opening (72) defined by the bearing assembly (70) (FIGS. 1 and 5).

As shown in FIG. 1, the drive shaft (34) is secured to a toothed gear (80) provided within a toothed interior (82) of a load shaft (84). The load shaft (84) is journaled to a steel support member (86) by a bearing (88) such as those known in the art. Preferably, the toothed gear (80), toothed interior (82) and load shaft (84) are all constructed of hardened stainless steel. The toothed interior (82) of the load shaft (84) is preferably lubricated with an oil (90) or similar lubricant and the load shaft (84) is provided with a retainer lip (92) to maintain the oil (90) within the toothed interior (82).

The opposite end of the drive shaft (34) is provided with a rotor (94) such as that used in prior art automobile brakes and the like. The rotor (94) is welded or similarly secured to the drive shaft (34). The drive shaft (34) is secured to a hydraulic linear actuator (96) sufficient to move the drive portion (50) of the drive shaft (34) from the drive space (54) of the first swing arm (12) to the drive space (98) of the second swing arm (14) (FIGS. 1 and 7). In the preferred embodiment, the maximum travel of the drive shaft is no more than ten (10) centimeters and, more preferably, no more than five (5) centimeters.

A caliper assembly (102) is slidably coupled to a track (104) which, in turn, is coupled to the linear actuator (96).

The track (104) allows the caliper assembly (102) to move laterally along with the rotor (94), while providing support for the caliper assembly (102) when the caliper assembly (102) is actuated to stop rotation of the rotor (94). The caliper assembly (102) is hydraulically coupled to a hydraulic pressure generator (106).

As shown in FIGS. 1 and 5, when the sprag assembly (42) is positioned within the race (38) and the drive portion (50) of the drive shaft (34) is positioned within the drive space (54) of the sprag assembly (42), the drive shaft (34) is thereby allowed to rotate freely in a first direction (counter-clockwise as shown) relative to the race (38), because this rotation tilts the sprags (48) away from their upright position (FIGS. 1 and 5). Conversely, the sprag assembly (42) prevents rotation of the drive shaft (34) in the opposite direction (clockwise as shown) relative to the race (38) as this rotation allows the sprags (48) to tilt toward their upright position, thereby wedging the sprags (48) between the drive portion (50) of the drive shaft (34) and the race (38).

Accordingly, when the drive portion (50) of the drive shaft (34) is positioned within the drive space (54), the drive shaft (34) is free to rotate in a counter-clockwise direction relative to the race (38) as such rotation tilts the sprags (48) away from their upright position. Conversely, if attempts were made to rotate the drive shaft (34) in a clockwise direction, the coil springs (46) bias the sprags (48) toward their upright position, thereby transferring torsional forces between the race (38) and the drive portion (50) of the drive shaft (34). As shown in FIG. 1, as the neck (36) of the swing arm (12) moves in an arc from right to left, torque is transferred from the neck (36) through the race (38) and sprag assembly (42) to the drive portion (50) of the drive shaft (34). As the neck (36) of the swing arm (12) is moved in an arc from left to right, little or not torque is transferred from the swing arm (12) to the drive shaft (34) as the drive portion (50) of the drive shaft (34) "freewheels" within the sprag assembly (42). Therefore, the neck (36) of the swing arm (12) can be repeatedly actuated in both directions to produce a single direction torque in a counter-clockwise direction on the drive shaft (34).

As shown in FIGS. 3 and 4, a sprag assembly (108) is secured within a race (110) of the second swing arm (14), in an opposite orientation from the sprag assembly (42) positioned within the race (38) of the first swing arm (12). As the result of this reverse orientation, when the drive portion (50) of the drive shaft (34) is positioned within a drive space (114) defined by the sprag assembly (108) of the second swing arm (14), and a neck (112) of the second swing arm (14) is moved back and forth in an arc, torque is transferred to the drive shaft (34) in a single but opposite direction from the torque applied by the first swing arm (12) (FIGS. 4, 5 and 7).

To operate the transmission assembly (10) of the present invention, a linear actuator (116) is provided with a piston shaft (118) slidably coupled to the connection rod (24) (FIG. 1). The linear actuator (116) may be any linear actuator known in the art, such as a combustion engine or hydraulic actuator. As shown in FIG. 1, the piston shaft (118) is pivotally connected to both the linear actuator (116) and connection rod (24) to allow the piston shaft (118) to pivot as the swing arms (12) and (14) move through their arcs. In operation, the linear actuator (96) is used to draw the drive shaft (34) toward the linear actuator (96), thereby moving the tapered shoulders (52) of the drive portion (50) of the drive shaft (34) into the drive space (54) of the torque transfer sprag (30), and pushing the sprags (48) away until the drive portion (50) of the drive shaft (34) is positioned within the drive space (54) of the torque transfer sprag (30) (FIGS. 1 and 5).

The linear actuator (116) is then actuated to move the piston shaft (116) and connection rod (24) relative to the linear actuator (116). As the connection rod (24) moves the first swing arm (12) back and forth, the first swing arm (12) imparts a counter-clockwise rotation to the drive shaft (34) through the torque transfer sprag (30) on the drive stroke and allows the torque transfer sprag (30) to "freewheel" in relation to the drive portion (50) of the drive shaft (34) on the recovery stroke. Accordingly, as the linear actuator (116) moves the piston (118) back and forth, a counter-clockwise rotation is imparted to the drive shaft (34) which, in turn, imparts the torque to the load shaft (84) through the toothed gear (80) and toothed interior (82) of the load shaft (84).

When it is desired to reverse the rotation of the load shaft (84), the linear actuator (96) is actuated to extend the drive shaft (34) until the drive portion (50) of the drive shaft (34) exits the drive space (54) of the torque transfer sprag (30). When the drive portion (50) of the drive shaft (34) is positioned between the two swing arms (12) and (14), as shown in FIG. 6, the swing arms (12) and (14) impart no more than a negligible torsional force to the drive shaft (34) through the bearing assemblies (70) and (120) (FIGS. 3, 5 and 6). As the drive shaft (54) extends, the rotor (94) pulls the caliper assembly (102) along. Once the drive portion (50) of the drive shaft (34) is positioned between the swing arms (12) and (14), the hydraulic pressure generator (106) actuates the caliper assembly (102) to stop rotation of the rotor (94) and drive shaft (34). Once rotation of the drive shaft (34) has stopped, the linear actuator (96) is again actuated until the tapered shoulders (52) of the drive portion of the drive shaft (34) sufficiently bias the sprag assembly (108) until the drive portion (50) of the drive shaft (34) is sufficiently positioned within the drive space (114) of the second swing arm (14) (FIGS. 3, 4, 5 and 7). As shown in FIG. 7, once the drive portion (50) of the drive shaft (34) is positioned within the drive space (114), the pivotal movement of the second swing arm (14) transfers torque to the drive shaft (34) and load shaft (84) in a direction opposite that imparted previously by pivotal movement of the first swing arm (12). As shown in FIGS. 1 and 7, when the drive portion (50) of the drive shaft (34) is positioned within the opposite swing arm, the orientation of the drive shaft (34) relative to the swing arms (12) and (14) is maintained by the bearing assemblies (70) and (120), which, as noted above, is designed to impart as little torque as possible between the swing arms (12) and (14) and the drive shaft (34).

FIG. 8 shows an alternative embodiment of the present invention having a toothed connection of the drive shaft (34) to the inner annular contact surface (40) of the race (38). In this embodiment, the inner annular contact surface (40) of the race (38) is provided with a toothed inner annular surface. Similarly, the drive portion (50) of the drive shaft (34) is also provided with a toothed connection (122). FIGS. 1, 5 and 8.

Although the invention has been described with respect to a preferred embodiment thereof, it is to be also understood that it is not to be so limited, since changes and modifications can be made therein which are within the full intended scope of this invention as defined by the appended claims. For example, it should be noted that a plurality of drive portions (50) and swing arms (12) and (14) may be provided on a single drive shaft (34), and secured to multiple linear actuators or a single linear actuator (116) to drive the load shaft (84) in a single direction in both the drive and recovery strokes of the linear actuator (116). In this embodiment, the transmission assembly (10) drives the load shaft (84) substantially continuously in a single direction and may be stopped and reversed to drive the load shaft (84) substantially continuously in the opposite direction.

What is claimed is:

1. A transmission assembly comprising:
   (a) An overrunning clutch assembly comprising:
      (i) a race having an inner annular contact surface;
      (ii) a plurality of sprags provided along said inner annular contact surface of said race, said plurality of sprags defining a drive space;
      (iii) means for retaining said plurality of sprags along said inner annular contact surface of said race;
   (b) a shaft having a drive portion with a drive diameter sufficient to cause rotation of said shaft in response to a rotation of said race when said drive portion is positioned at least partially within said drive space;
   (c) means for moving said drive portion of said shaft at least partially into and out of said drive space;
   (d) wherein said shaft is provided with a neutral portion of a neutral diameter insufficient to transfer a substantial rotation of said race to said shaft when said neutral proportion is positioned within said drive space; and
   (e) wherein said shaft tapers from said drive portion to said neutral portion.

2. The transmission assembly of claim 1, wherein said moving means is means for moving said neutral portion of said shaft into and out of said drive space.

3. The transmission assembly of claim 1, further comprising an inner race positioned between said shaft and said plurality of sprags.

4. The transmission assembly of claim 3, wherein said inner race is provided with a toothed inner annular surface.

5. The transmission assembly of claim 4, wherein said drive portion of said shaft is provided with a toothed surface.

6. The transmission assembly of claim 5, wherein said shaft is provided with a neutral portion without teeth and wherein said moving means is means for moving said neutral portion of said shaft into and out of said drive space.

7. The transmission assembly of claim 1, further comprising means for slowing a rotation of said shaft.

8. The transmission assembly of claim 1, further comprising means for driving said outer race.

9. The transmission assembly of claim 1, further comprising a supplemental overrunning clutch assembly comprising:
   (a) a supplemental race having a supplemental inner annular contact surface;
   (b) a supplemental plurality of sprags provided along said supplemental inner annular contact surface of said supplemental race, said supplemental plurality of sprags defining a central supplemental drive space; and
   (c) supplemental means for retaining said supplemental plurality of sprags along said supplemental inner annular contact surface of said supplemental race.

10. The transmission assembly of claim 9, wherein said supplemental overrunning clutch assembly is positioned substantially parallel to said overrunning clutch assembly.

11. The transmission assembly of claim 9, wherein said overrunning clutch assembly (OCA) is provided around said shaft in an orientation whereby rotation of said race in a first direction transfers rotation to said shaft in said first direction when said drive portion is positioned at least partially within said drive space, wherein said supplemental overrunning clutch assembly is provided around said shaft in an orientation whereby rotation of said supplemental race in a second direction transfers rotation of said supplemental race in said second direction when said drive portion is positioned at least partially within said supplemental drive space and wherein said first direction is opposite said second direction.

12. The transmission assembly of claim 11, further comprising means for driving said race in said first direction and driving said supplemental race in said second direction.

13. The transmission assembly of claim 9, wherein said shaft is provided with a neutral portion of a neutral diameter insufficient to transfer a substantial rotation of said race to said shaft when said neutral portion is positioned within said drive space and wherein said neutral diameter is insufficient to transfer a substantial rotation of said supplemental race to said shaft when said neutral portion is positioned within said supplemental drive space.

14. The transmission assembly of claim 13, wherein said moving means is means for moving said neutral portion between said drive space and said supplemental drive space.

15. The transmission assembly of claim 9, further comprising an inner race positioned between said shaft and said plurality of sprags.

16. The transmission assembly of claim 15, wherein said inner race is provided with a toothed inner annular surface.

17. The transmission assembly of claim 16, wherein said drive portion of said shaft is provided with a toothed surface.

18. The transmission assembly of claim 9, further comprising means for slowing a rotation of said shaft.

* * * * *